(No Model.) 3 Sheets—Sheet 1.
J. M. CASE.
DUST COLLECTOR.
No. 563,709. Patented July 7, 1896.
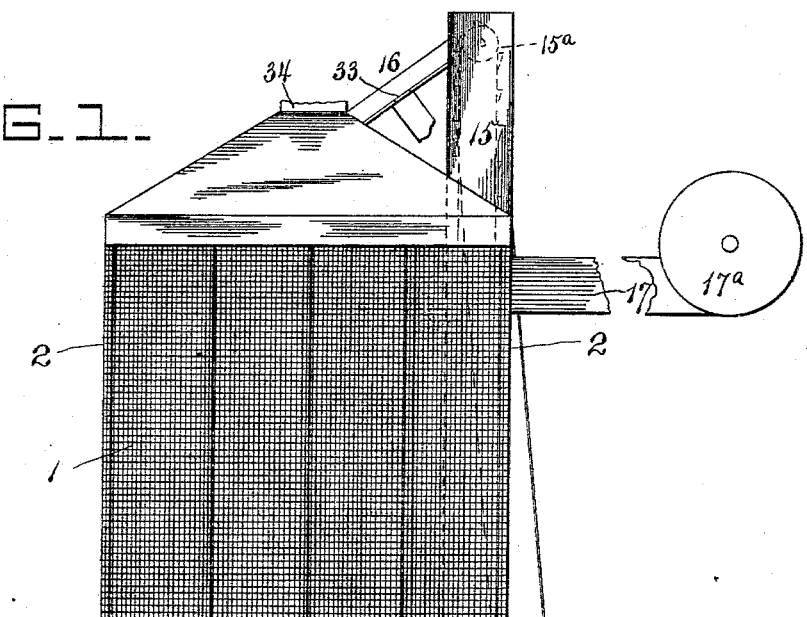

(No Model.) 3 Sheets—Sheet 2.
J. M. CASE.
DUST COLLECTOR.

No. 563,709. Patented July 7, 1896.

Witnesses
Walter Ellwood Allen.
Herbert Bradley.

Inventor
John M. Case.
By Knight Bros
Attys.

(No Model.) 3 Sheets—Sheet 3.
J. M. CASE.
DUST COLLECTOR.
No. 563,709. Patented July 7, 1896.
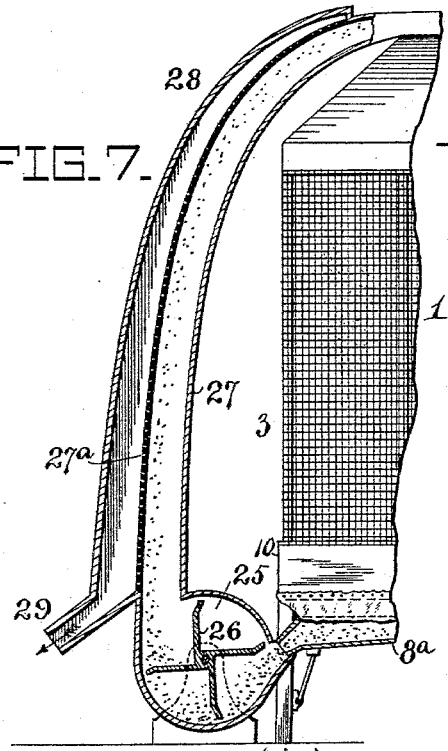
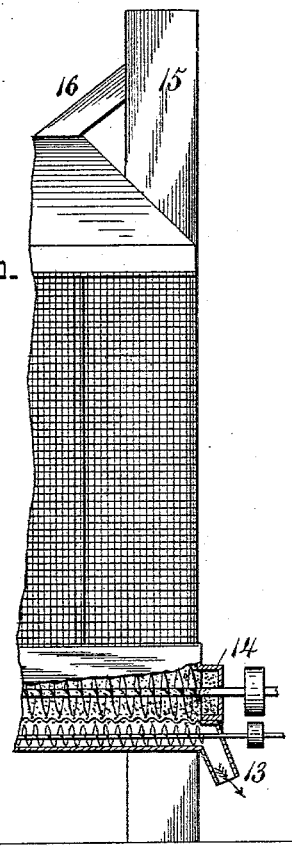
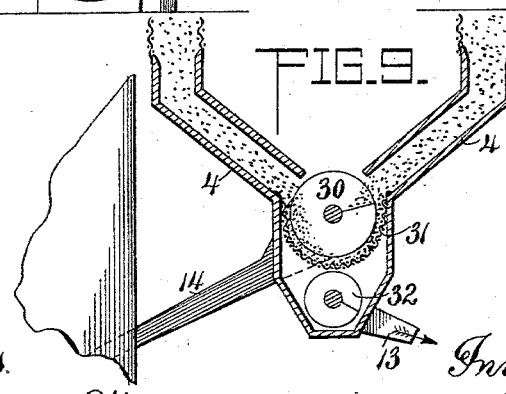
Witnesses.
Walter Ellwood Allen.
Herbert Bradley.
Inventor.
John M. Case.
By Knight Bros.
Attys.

UNITED STATES PATENT OFFICE.

JOHN M. CASE, OF CINCINNATI, OHIO.

DUST-COLLECTOR.

SPECIFICATION forming part of Letters Patent No. 563,709, dated July 7, 1896.

Application filed April 15, 1896. Serial No. 587,656. (No model.)

*To all whom it may concern:*

Be it known that I, JOHN M. CASE, a citizen of the United States, and a resident of Cincinnati, in the county of Hamilton and State of Ohio, have invented certain new and useful Improvements in Dust-Collectors, of which the following is a specification.

The subject of my invention is a process and apparatus for use principally in connection with milling machinery in which dust is collected by forcing the dust-laden air, by means of a blast, through a continuously-moving body of wheat or other granular material which is caused to descend in contact with screens through which the dust-laden air is forced, the said granular material returning by suitable elevating appliances, so as to travel in a continuous circuit and be used over and over.

Figure 5:
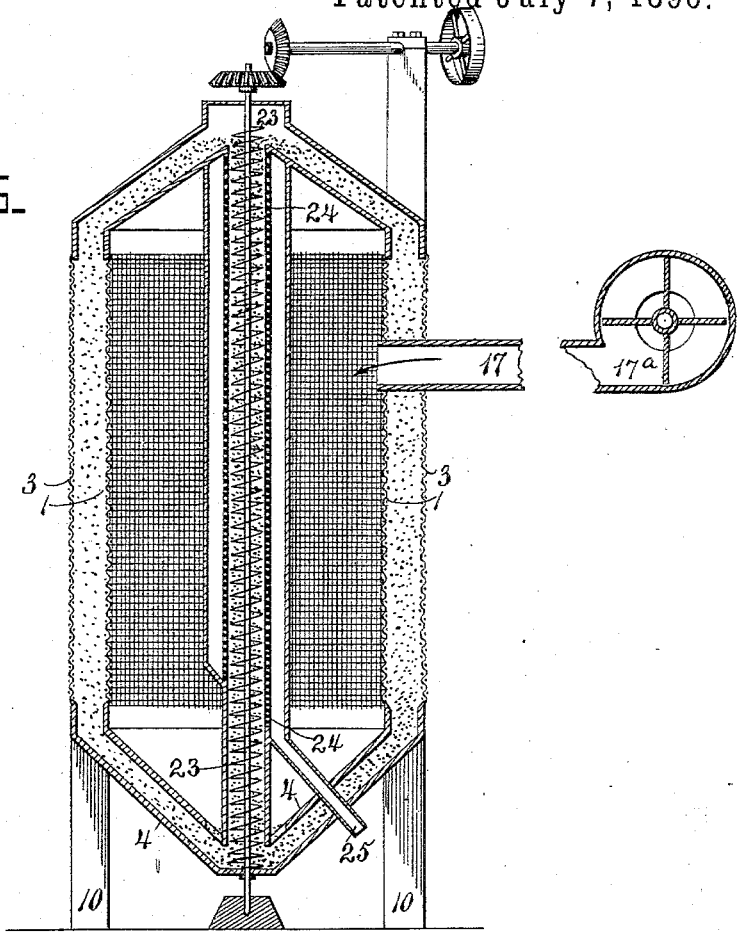
Figure 6:
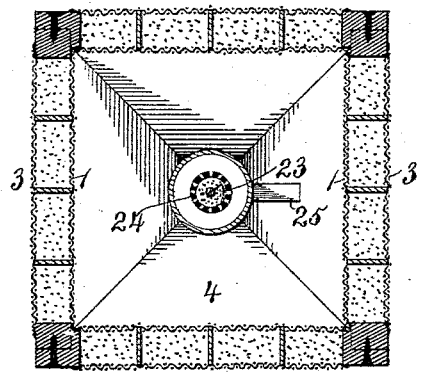

In the accompanying drawings, Figure 1 is a side elevation of a suitable apparatus for carrying my invention into effect. Fig. 2 is a vertical transverse section of the same. Fig. 3 is a plan view thereof; Fig. 4, a detail sectional elevation, on a larger scale, illustrating a mode of graduating the discharge of the granular material from the screening device where it is charged with dust to the separator where the dust is sifted out of it, and from which the granular material is again elevated for reuse as above stated. Fig. 5 is a vertical section of the apparatus in a modified form. Fig. 6 is a horizontal section of the apparatus shown in Fig. 5. Fig. 7 is an elevation of the apparatus, partly in section, illustrating another modification. Fig. 8 is an elevation, partly in section, showing still another modification. Fig. 9 is a vertical section on a plane at right angles to that shown in Fig. 8, showing the sifting and dust-discharging device at the lower part of the apparatus.

In Figs. 1 and 2, 1 1 represent a pair of stationary vertical screens formed of parallel walls, the spaces between them being open at top and bottom to permit the continuous passage therethrough of a body of granular material, and closed at the ends by a wall 2.

3 3 are outer screens parallel with screens 1 1, formed of similar reticulated material.

The space between the walls 1 and 2 on each side of the apparatus forms a passage which in operation is constantly filled with suitable granular material, such as wheat, corn, rye, or cotton-seed, through which the said granular material descends by gravity in continuous movement. This space communicates at bottom with a pair of chutes 4 4, extending horizontally from end to end of the apparatus and converging to the center in a longitudinal spout 5, extending from end to end of the apparatus. Beneath this spout 5 and parallel therewith, at a variable distance, is a horizontal board, the proximity of the said board 6 to the bottom of the spout 5 serving to regulate the discharge of the granular material from the passage between the screen-walls 1 and 3. On the horizontal board 6 is mounted a web or rail 7, and these connected parts 6 7 are hinged at one end in a box 8, which is provided with a horizontal screen 9, so as to constitute a shaking sieve, for which purpose the box 8 with its attached parts is suspended beneath the fixed base-frame 10, on which the entire apparatus is mounted, by means of pivotal hangers 11, of common form, so pivoted to the stationary frame 10 and the sieve-box 8 as to permit a longitudinal shaking movement of the latter. The said shaker 8 is further connected with the stationary base 10 by loose canvas 12 at the sides and ends, which permits the shaking of the sieve while preventing the passage of air.

The discharge of dust from the base beneath the screen is through a suitable spout or aperture 13. The wheat is discharged from the top of the shaking sieve 9 through a spout 14 into an elevator-box 15, in which it is carried by a bucket-elevator 15ª, of common form, to a spout 16, which returns it to the top of the apparatus, thus keeping the space between the vertical screens 1 and 3 and the space above them constantly filled with moving granular material.

The dust-laden air from the purifiers or other similar apparatus, or any body of air from which dust is to be collected, is forced, by a blast-fan 17ª, for example, to the dust-separator through a trunk 17, delivering into the space between the parallel screen-walls 1 1.

From the description thus far given of the apparatus the operation thereof in collecting dust and discharging the air from which the dust has been recovered will be clearly understood. The blast by which the dust-laden air is forced through the trunk to the interior of the apparatus maintains a sufficient pressure of air through the same by which the air is forced outward through the parallel screen-walls 1 1 and the constantly-moving body of wheat or other granular material on the exterior thereof, the air escaping through the outer screen-walls 3 3, while the dust is completely intercepted by the descending body of granular material between the walls 1 and 3. The dust-laden wheat or granular material is delivered by the converging chutes 4 4 on top of the longitudinal shaking sieve 9 9, by which sieve the dust is separated from the granular material descending to the box 8 below, from which it passes out through the dust-spout or aperture 13 to any suitable receptacle. From this description it will be understood that the granular material is constantly moving in continuous and endless circuit through the apparatus, descending by gravity between the screen-walls 1 and 3 and returning by the elevator 15 to the top of the apparatus for reuse. The shaking of the sifter 8 9 is effected in customary manner by a connecting-rod 18, attached at one end to the bottom of the sieve-box 8 and at the other end to a crank 19 on a rotating shaft 20. To facilitate the discharge of the granular material from the spout 5 to the surface of the sieve 9, the outer surface of the discharge-board 6 is corrugated or ribbed, as shown in Fig. 4, and to regulate the discharge the free end of the web or beam 7, on which said board is mounted, is suspended by a regulating-screw 21 from a suitable standard 22 on the sieve-box 8.

In the modification illustrated in Figs. 5 and 6 the apparatus is constructed with four instead of two parallel screen-walls 1 3, through the vertical spaces between which the granular material is constantly descending, the shaking-sieve at bottom is dispensed with and the granular material is returned to the top of the apparatus by a screw-elevator 23, working in a vertical shaft 24, of perforated metal or other material, through the openings in which the dust is discharged from the granular material as it is carried through in contact with the inner surface thereof, under pressure due to gravity and the forcing action of the elevating-screw. The dust thus removed from the granular material is discharged through a spout 25, and the granular material is continuously returned to the top of the apparatus as before, descending through the space between the screen-walls through which the air is forced by pressure of the blast, so that the granular material by which it is caught and separated from the air moves, as before, in a constant and endless circuit. It is apparent that the body of the screens may be made of circular, hexagonal, or any other form, but I prefer the rectangular form as most convenient to construct.

In the modification shown in Fig. 7 the screen-walls are made similarly to the parallel walls 1 and 3 in Figs. 1 and 2, but the shaking sieve is dispensed with, the granular material being discharged upon a shaker 8$^a$, which delivers the dust-laden granular material to the case 25 of a rotary fan 26, from which rises in vertical tangential position a spout 27, curved into horizontal position at top to return the wheat or other granular material to the top of the apparatus, as before, and having a perforated outer wall 27$^a$, through the perforations in which the dust is discharged from the wheat or granular material as the latter is thrown up by its own momentum produced by the centrifugal action of the rotary fan 26. The perforated wall 27$^a$ is covered at a suitable distance with an imperforate casing 28, between which and the perforated wall 27$^a$ is formed a chute or passage through which the dust descends and from which it is discharged by a spout 29.

In the modification illustrated in Figs. 8 and 9 the apparatus is constructed as described with reference to Figs. 1 and 2, excepting that the shaking sieve 8 9 and its accessories are dispensed with and the dust-laden granular material is delivered at bottom to a screw conveyer 30, working in a stationary semi-cylindrical screen 31, through which the dust is separated from the granular material, the latter being delivered by a screw conveyer to the elevator 15$^a$, Figs. 1 and 2, while the dust is discharged by another screw conveyer through the dust-spout 13.

My invention, as above explained, involves the continuous use of the same body of granular material, which is passed in a continuous circuit through the machine, collecting the dust from the dust-laden air, discharging the purified air, then discharging the dust, and then carrying back, for reuse, the granulated material from which the dust has been sifted out. The same body of wheat or other granular material may thus be used over and over for many months and for an indefinite period, and when it is desirable to replace or to renew it the used wheat or other granular material may be drawn out by means of a slide 33, and a new supply may be introduced at top through a spout or hopper 34. The embodiment of the apparatus illustrated in Figs. 1 and 2 is superior in that the wheat, if wheat be used as the granular material, is subjected to no material wear or destructive abrasion, so that the same body of material may be used almost indefinitely without material loss. The form of apparatus illustrated in Figs. 3 and 4 subjects the wheat to greater wear, and this may, if desired, be utilized as a wheat-scouring apparatus, while carrying into effect my improved process for collecting dust by forcing the dust-laden air, by the action of a blast, through a body of granular material which is moving continuously in an endless circuit, suitable means being provided to draw off the wheat when sufficiently scoured and in condition for grinding, and to introduce a new supply.

By "granular material," as is used in the specification and claims, I do not limit myself to grain of any particular kind or to any material of substantially similar shape, but desire to cover by such term any material made up of small particles which, if delivered in mass into the space which defines the filtering-wall, will form small spaces or pockets through which the air may pass and in which the dust or substance carried by the air will lodge or otherwise be arrested by coming in contact with the surfaces of the particles which go to make up the intercepting-wall. It is found in practice to be of utmost importance to provide for a repeated use of the same body of granular material for arresting the dust, for without this feature the device would be impracticable, owing to the requirement of fresh material in unobtainable quantities, and owing to the fact that such fresh material is always impregnated with dirt and foul substances which would become mingled with the arrested dust and thus render useless the product obtained by the dust-catcher for anything more valuable than feed. In all profitable mills where close yield is obtained, the dust from the purifiers, which it is intended to collect by my present apparatus, is bolted, and the flour and middlings separated and made into a second-grade flour which is worth much more than feed. Hence it is of greatest importance that the material arrested by the dust-catcher should be kept free from the foul matter which is always present in fresh granular material. By the continual or repeated use of the same wheat or granular material, the latter becomes at once freed of all foul substances, and hence there can be no deterioration of valuable products which are arrested by passing the dust-laden air through the continuously-returning mass of such material. The idea of continually returning the granular material to the filtering-wall is therefore of vital importance. By suitably advancing the granular material the component parts of the filtering medium are continually sifted, so that new and unobstructed packets are continually being formed and the filled packets continually pass off to be emptied of the arrested dust. By delivering the dust-laden air into the chamber by means of an air-blast the heavier particles are precipitated by the force of the blast and pass to the separating device below without coming into contact with the filtering-wall, thus materially increasing the capacity of the machine, the filtering capacity being limited by the quantity of material which will be received by the packets which form in the granular material. A further very important result obtained from the continuous use of the same material with the intervening mechanism which continuously removes the arrested matter therefrom is that a machine is produced which is a complete automatic entity in itself and is not dependent in the performance of its functions upon association with other mechanism for the supply of some material feature to its operation.

My invention is of great utility for purifying the air in mills and other establishments. By the use of fans taking the dust-laden air at one or more points, passing it through my apparatus, and discharging the purified air therefrom at another distant point or points, the entire atmosphere of a mill may be relieved of dust, which is a constant source of danger in causing explosions and is also highly prejudicial to health.

Having thus described my invention, the following is what I claim as new therein and desire to secure by Letters Patent:

1. The process herein described of collecting dust, which consists in passing the dust-laden air through a suitably-arranged body of granular material, separating the dust taken up by said material and returning the latter continuously for reuse, as explained.

2. The process herein described, of collecting dust, which consists in forcing the dust-laden air, under pressure, through a body of granular material, moving continuously between suitable screens, sifting the dust out of the granular material, and returning the latter continuously for reuse.

3. The combination of a chamber having a wall comprising a suitably-arranged body of granular material which has an unobstructed communication on its outer side with the atmosphere, means for shifting the component particles of such granular material and a blast apparatus receiving at its inlet the dust-laden air and delivering it into said chamber, and constructed to maintain pressure therein, substantially in the manner and for the purpose set forth.

4. The combination of a chamber having a wall comprising a suitably-advancing body of granular material, a blast apparatus receiving the dust-laden air and delivering the same into said chamber, means for removing the dust from the granular material and means for continuously returning the purified granular material to the continuously-moving body forming the wall, as explained.

5. The combination of a suitably-advancing body of granular material, means for forcing dust-laden air therethrough, means for sifting the dust out of the granular material for the purpose of purifying said material and means for repeatedly elevating and returning the purified granular material for reuse, substantially as explained.

6. The combination with descending columns of granular screening material, of a fan for collecting dust-laden air, a separating mechanism for removing the dust from the screening material for the purpose of purifying said material and an elevating device for returning the purified material whereby a continuous circuit of dust-arresting granular material is produced, and the dust separated therefrom.

JOHN M. CASE.

Witnesses:
GEO. E. CRUSE,
H. S. KNIGHT.